(12) United States Patent  
Friedrich

(10) Patent No.: US 7,495,425 B2
(45) Date of Patent: Feb. 24, 2009

(54) BUCK CONVERTER WITH DEMAGNETIZATION DETECTION OF THE INDUCTOR

(75) Inventor: Heiner Friedrich, Lobenstein (DE)

(73) Assignee: PULS GmbH, Munich (DE)

( * ) Notice: Subject to any disclaimer, the term of this patent is extended or adjusted under 35 U.S.C. 154(b) by 285 days.

(21) Appl. No.: 11/332,486

(22) Filed: Jan. 17, 2006

(65) Prior Publication Data

US 2006/0158160 A1 Jul. 20, 2006

(30) Foreign Application Priority Data

Jan. 18, 2005 (DE) .................. 10 2005 002 360

(51) Int. Cl.
*G05F 1/565* (2006.01)
(52) U.S. Cl. .................. 323/290; 323/285; 323/282
(58) Field of Classification Search ................ 323/290, 323/285, 282, 284, 247, 259
See application file for complete search history.

(56) References Cited

U.S. PATENT DOCUMENTS

| 5,134,355 | A | | 7/1992 | Hastings |
| 5,412,308 | A | * | 5/1995 | Brown ..................... 323/267 |
| 6,366,070 | B1 | * | 4/2002 | Cooke et al. ............. 323/284 |
| 6,388,429 | B1 | | 5/2002 | Mao |

FOREIGN PATENT DOCUMENTS

| EP | 1 580 638 A1 | 9/2005 |
| WO | WO 03/001314 A1 | 1/2003 |

OTHER PUBLICATIONS 0-7803-5160, 1999 IEEE pp. 11301135, Fabiana Pottker de Souza and Ivo Barbi, entitled, "A Unity Power Factor Buck Pre-Regulator with Feedforward of the Output Inductor Current"p.

* cited by examiner

*Primary Examiner*—Akm E Ullah
*Assistant Examiner*—Harry Behm
(74) *Attorney, Agent, or Firm*—Miles & Stockbridge P.C.; Eric G. King

(57) ABSTRACT

A buck converter is equipped with a switch, a diode, an inductance, a capacitor, an input with a first connection and second connection, and an output with a first connection and second connection. The first connection of the input is connected to the first connection of the output via a series circuit comprised of the switch and the inductance; in particular, the switch is provided on the input side and the inductance is provided on the output side. In addition, the cathode of the diode is connected to the connection between the switch and the inductance while the anode of the diode is connected to the second connection of the input and to the second connection of the output. The capacitor is connected in parallel with the connections of the output. It is possible to trigger the switch by combining a first signal with a second signal and a third signal corresponding to a control variable from the output of the buck converter may be used to adjust the output signal.

28 Claims, 10 Drawing Sheets

BUCK CONVERTER WITH DEMAGNETIZATION DETECTION OF THE INDUCTOR

BACKGROUND OF THE INVENTION

1. Field of the Invention

The invention relates to a buck converter, a triggering method, and a use of the buck converter.

2. Description of the Related Art

Power supplies, in particular switching power supplies and switched mode power supplies as well as primarily and secondarily clocked switching controllers are known from [1]. Every electrical power consuming component requires a supply of electrical power, which is provided by a power supply and/or a power pack. Throughout the world, power lines are used as transmission lines in order to supply current and voltage to a virtually limitless array of electrical devices via electrical outlets. To this end, standardized alternating currents, e.g. 120 volts in the USA and 230 volts in Germany, are customarily supplied via the power lines.

In power factor correction, power consuming components in the circuit, in particular capacitances and inductances of a circuit, are compensated for through an appropriate wiring. Capacitances and inductances are provided, which act in opposition to the capacitive and inductive components of the circuit, thus largely compensating for them. With regard to the topic of power factor correction, the reader is referred to power factor correction at www.tpub.com/neets/book2/4k.htm, for example.

A power supply, e.g. a switched mode power supply, with a nonlinear load characteristic generates current harmonics, even when fed by a purely sinusoidal supply voltage. The line impedance generates harmonics that influence the line voltage and can lead to malfunctions. With regard to CE conformity labeling, it is necessary to test whether the products comply with the requirements of the EMC law. Guidelines related to this classify both the permissible degree of electromagnetic interference emission and the resistance to malfunction in the presence of electromagnetic interference. The permissible limit values and measurement procedures for current harmonics are set forth in the standard EN61000-3-2 (also see EMV—Messtechnik [EMC Metrology]: "Gegen Störungen aus dem Netz—Erfüllen Ihre Produkte die EN61000-3-2/-3?" [Preventing Interferences From the Power Grid—Do Your Products Comply with EN61000-3-2/-3?], Endress +Hauser eA, pp. eA 29, on the Internet at: www.zes.com/download/zes_sys6lk_presse_ea_8_01.pdf.

The object of the invention is to disclose a buck converter that essentially conforms to the above-mentioned EN61000-3-2, and is efficient particularly with regard to the power factor correction. The present invention also discloses a triggering method and several uses of the buck converter.

This object is attained according to the defining characteristics of the independent claims. Modifications of the invention are disclosed in the dependent claims.

In order to attain the object of the invention, a buck converter is disclosed, which is equipped with a switch, a diode, an inductance, a capacitor, an input with a first connection and second connection, and an output with a first connection and second connection. The first connection of the input is connected to the first connection of the output via a series circuit comprised of the switch and the inductance; in particular, the switch is provided on the input side and the inductance is provided on the output side. In addition, the cathode of the diode is connected to the connection between the switch and the inductance while the anode of the diode is connected to the second connection of the input and to the second connection of the output. The capacitor is connected in parallel with the connections of the output. The switch can be triggered by combining a first signal with a second signal.

It is thus advantageous that a combination or concatenation of the first signal and the second signal is used to trigger the switch. Because two different signals or information sources are used, the circuit (the buck converter) not only operates efficiently, i.e. provides an efficient power factor correction, but also contains the harmonic amplitudes in accordance with the standard EN61000-3-2.

In one modification, the first connection of the input is a positive connection and the second connection of the input is a negative connection. It is also possible for the first connection of the output to be a positive connection and for the second connection of the output to be a negative connection.

In a preferred embodiment, the polarities of the connections of the input are reversed. In this case, the connections of the cathode and anode of the diode are reversed and in particular, the polarity of the switch is reversed.

According to one embodiment, it is possible to trigger the switch by combining the first signal with the second signal and a third signal. In particular, the third signal can be a control variable from the output of the buck converter. The third signal can also be used to adjust the output signal of the buck converter. In addition, the third signal can be a signal that is constant or that varies in an essentially slow fashion. Preferably, the third signal can be adjusted and/or regulated by means of predetermined or predeterminable parameters. At least one of the following parameters or arbitrary combinations of the following parameters can be used: output voltage of the buck converter, output current of the buck converter, or power of the buck converter.

According to one modification, the switch is comprised of at least one electronic switch.

In another modification, the diode is embodied in the form of an electronic switch. In particular, in order to replace the diode with a MOSFET, it is possible to reduce the switching losses, particularly during an overload operation of the buck converter.

In particular, it is possible to replace the electronic switch with at least one (bipolar) transistor, a field effect transistor, a MOSFET, a thyristor, or an IGBT. It is also possible for combinations of the above-mentioned components to be used as one or more electronic switches.

In one embodiment, the above-mentioned combining of the first signal with the second signal is an overlaying or addition of the two signals.

In one modification, the sum of the first signal and the second signal is compared to the third signal.

The first signal can be a current signal that corresponds in particular to the current flowing through the inductance or through the electronic switch. The current signal can optionally be predetermined or determined by the inductance. In this case, the triggering of the (electronic) switch is influenced by the current of the inductance. To that end, it is possible, for example, for an auxiliary winding of the inductance to be provided, whose signal (current and/or voltage flowing through the auxiliary winding) is evaluated for purposes of triggering the switch.

It is also possible for the current signal to be determined through an integration of a sum based on a voltage in the inductance.

In one modification, the second signal is an essentially triangular signal or an essentially saw tooth-shaped signal. In particular, this essentially triangular or essentially shaped-shaped signal can be generated or predetermined by a generator, in particular a saw tooth generator.

In another modification, the addition of the current signal and the essentially triangular or essentially shaped-shaped signal can be established through an integration of a voltage in the inductance and another voltage. The additional voltage can be determined using a peak value rectification of the voltage in the inductance. It is also possible for the peak value rectification to be carried out with a retention time constant that is in particular (significantly) greater than the line period (e.g. by a factor of 5).

In another modification, an additional peak value rectification is provided, which has a time constant that is in particular (significantly) less than the line period (e.g. by a factor of ⅕).

In addition, it is possible to limit the switch-on duration of the switch, e.g. if the voltage in the inductance falls below a predetermined minimum.

In one modification, the capacitor is an electrolytic capacitor. In this case, its positive pole is connected to the first connection of the output.

The inductance can be embodied in the form of a coil, in particular a throttle.

It is also possible for a rectifier circuit to precede the buck converter.

It is also possible for the buck converter to be used in a power supply, particularly in a power pack or a switched mode power supply. It is also possible for the power supply to be mounted on a mounting rail and/or in a switching cabinet.

A method for triggering the buck converter is also disclosed in order to attain the above-mentioned object of the invention.

The buck converter can also be used for limiting switch-on current and/or for masking or suppressing transients.

It should be noted here that the term overvoltage is intended herein to apply to all forms of voltages greater than a predetermined supply voltage, in particular a line voltage, and all forms of voltage spikes. In particular, the term "transient" is intended herein to apply to all types of chronologically limited overvoltages that deviate from the target values of the electrical supply voltage. It should additionally be noted that an overvoltage can also result from a current spike.

The buck converter can be operated in a single phase network and/or in a three-phase network.

The buck converter is particularly suitable for use in power factor correction.

BRIEF DESCRIPTION OF THE DRAWINGS

Exemplary embodiments of the invention will be illustrated and explained below in conjunction with the drawings.

DESCRIPTION OF THE PREFERRED EMBODIMENTS

Figure 1:
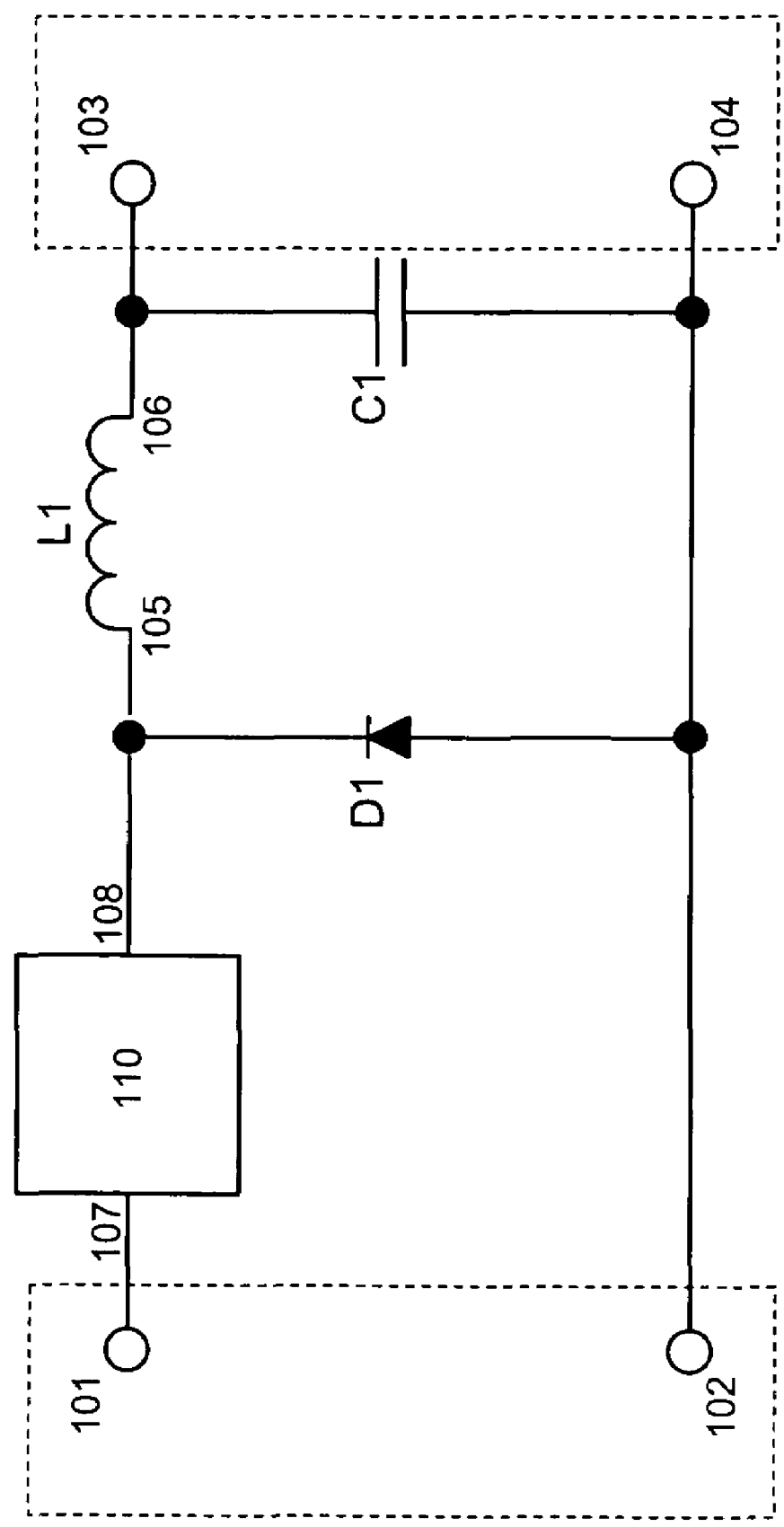
FIG. 1 is a circuit diagram of a buck converter.

FIG. 1 shows a circuit diagram of a buck converter that is equipped with an input (with connections 101 and 102), an output (with connections 103 and 104), a diode D1, a switch 110 (with connections 107 and 108), an inductance L1 (with connections 105 and 106), and a capacitor C1.

The connection 101 of the input is connected to the connection 107 of the switch 110. The connection 108 of the switch 110 is connected to the cathode of the diode D1 and to the connection 105 of the inductance L1. The connection 106 of the inductance L1 is connected to the connection 103 of the output. The capacitor C1 is situated in parallel with the output, i.e. it is connected to the connections 103 and 104. If the capacitor C1 is embodied in the form of an electrolytic capacitor, then its positive pole is connected to the connection 103 of the output. The connection 102 of the input is connected to the connection 104 of the output and to the anode of the diode D1.

Optionally, the polarity of the diode D1 in FIG. 1 can be reversed, i.e. the anode and cathode can be reversed. In this case, the polarity also changes at the input and output and also on the (electronic) switch 110.

Figure 2:
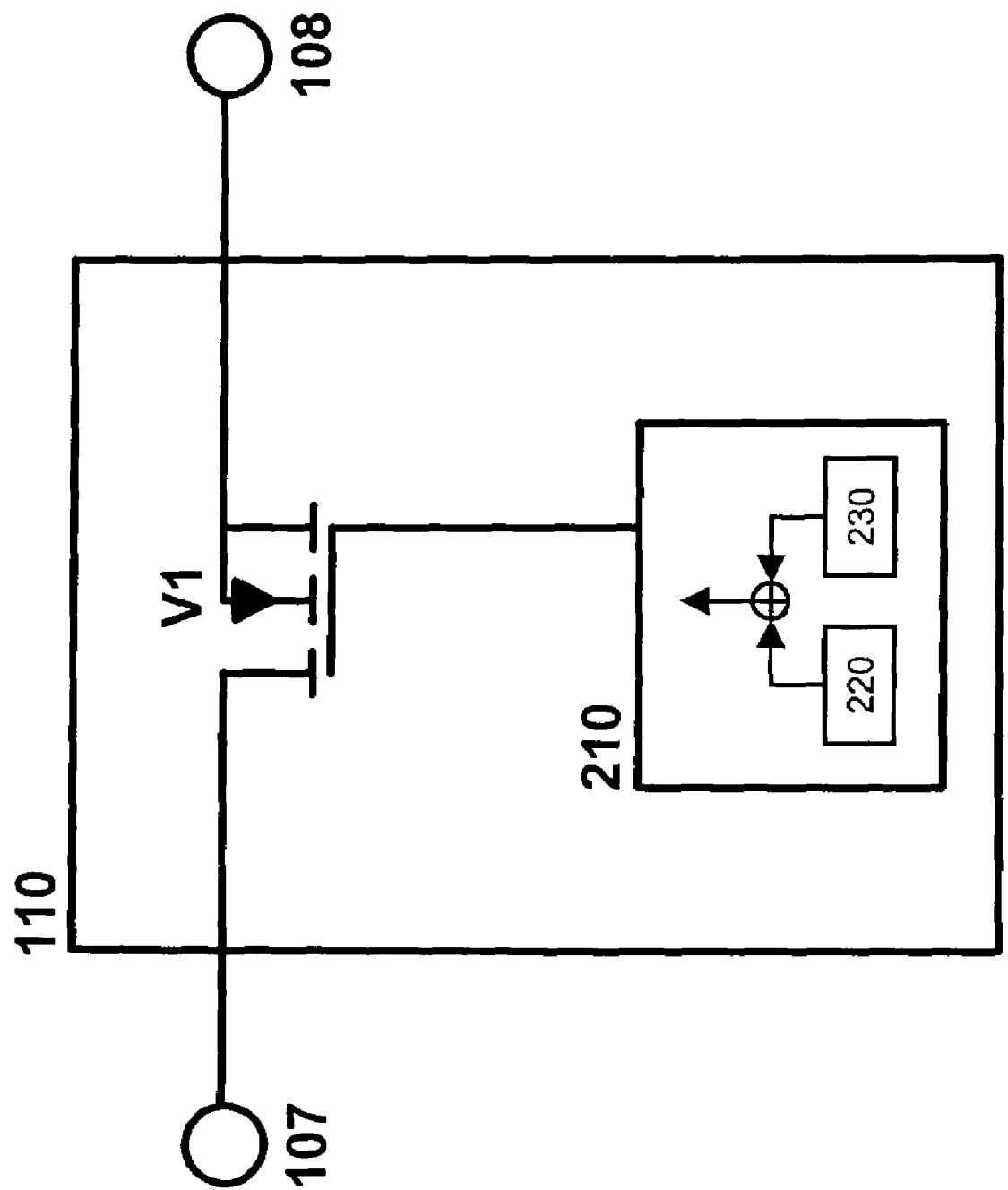
FIG. 2 is a circuit diagram of a switch in a buck converter.

FIG. 2 shows a wiring of the switch 110. FIG. 2 shows the connections 107 and 108 of the switch 110 from FIG. 1. FIG. 2 also shows an n-channel MOSFET V1 (for example for an electronic switch), a triggering unit 210 with a current control unit 220 and a generator 230, in particular a saw tooth generator.

The drain connection of the MOSFET V1 is connected to the connection 107 of the switch 110, while the source connection of the MOSFET V1 is connected to the connection 108 of the switch 110. The gate connection of the MOSFET V1 is connected to the triggering unit 210. The current control unit 220 supplies a first signal while the generator 230 supplies a second signal. In the triggering unit 210, the first signal is combined with the second signal, in particular is added to it.

It is thus possible to overlay a current signal (e.g. an evaluation of the current through the inductance L1) with a saw tooth signal and thus to evaluate the combined (e.g. added) signal in the triggering unit 210 and to trigger the gate connection of the MOSFET V1 (e.g. by using an additional driver stage, not shown in FIG. 2). On the one hand, this results in an efficient power factor correction and on the other hand assures that the harmonic amplitudes comply with those according to the standard EN61000-3-2.

Figure 3:
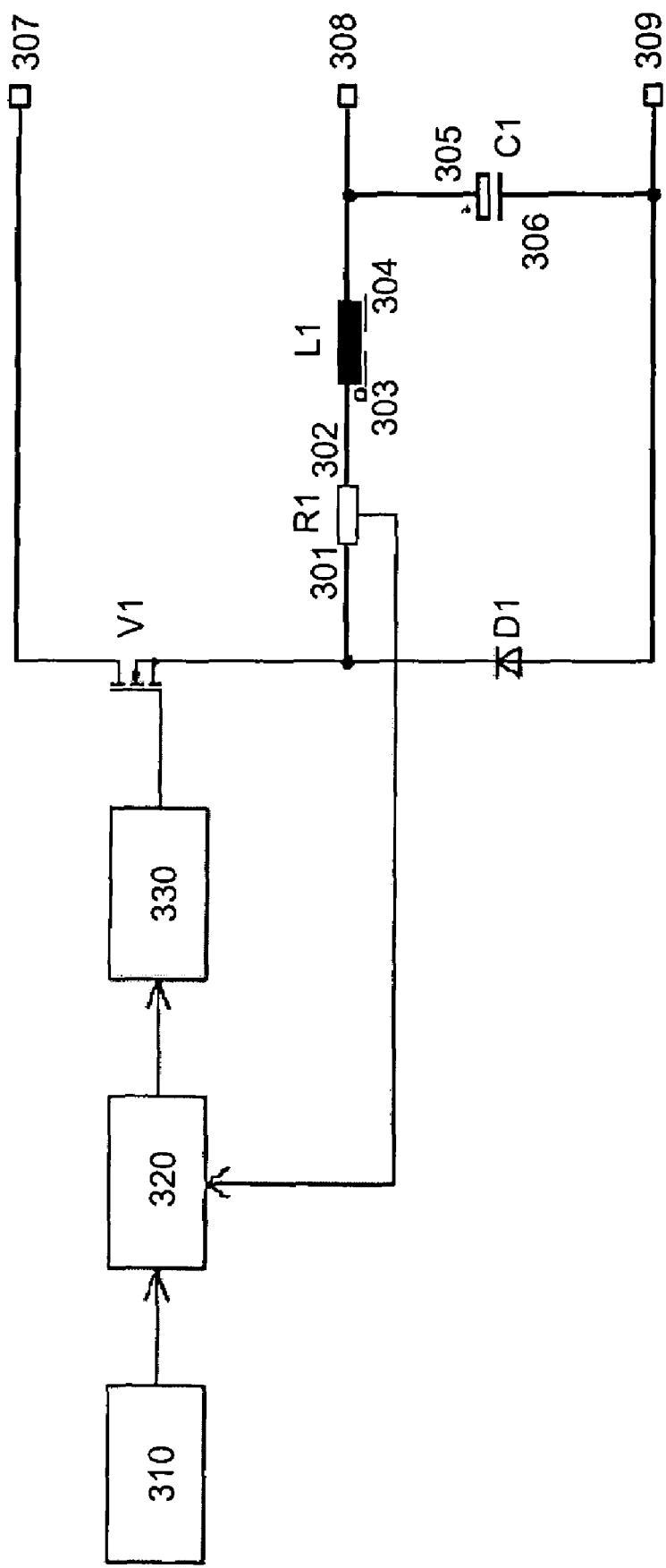
FIG. 3 is another circuit diagram of a buck converter with a triggering of an electronic switch.

FIG. 3 shows another circuit diagram of a buck converter with a triggering of a switch. The circuit diagram in FIG. 3 includes a control voltage unit 310, a pulse width modulation unit 320, a driver stage 330, a MOSFET V1, a measurement resistor R1 (with connections 301 and 302), an inductance L1 (with connections 303 and 304), a diode D1, and a capacitor C1 (with connections 305 and 306 (in the case of an electrolytic capacitor, the connection 305 is the positive pole)). An input (with connections 307 and 309) and an output (with connections 308 and 309) are also provided (the input and the output share the common connection 309).

The control voltage unit 310 supplies a control voltage to the pulse width modulation 320, which also receives information from the measuring resistor R1 regarding the current flowing through the inductance L1. Based on these pieces of information, i.e. the control voltage and the current through the inductance L1, the pulse width modulation 320 generates a signal for triggering the gate connection of the n-channel MOSFET V1 via the driver stage 330. The drain connection of the MOSFET V1 is connected to the connection 307 of the input. The source connection of the MOSFET V1 is connected to the cathode of the diode D1 and to the connection 301 of the resistor R1. The connection 302 of the resistor R1 is connected to the connection 303 of the inductance L1, while the connection 304 of the inductance L1 is connected to the connection 308 of the output and to the connection 305 of the capacitor C1. The connection 306 of the capacitor C1 is connected to the anode of the diode D1 and to the connection 309 of the output.

The current I flowing through the resistor R1 is needed to trigger the switch V1. To that end, FIG. 3 symbolically depicts this flow of information (via the current I) from the resistor R1 to the pulse width modulation 320.

Figure 4:
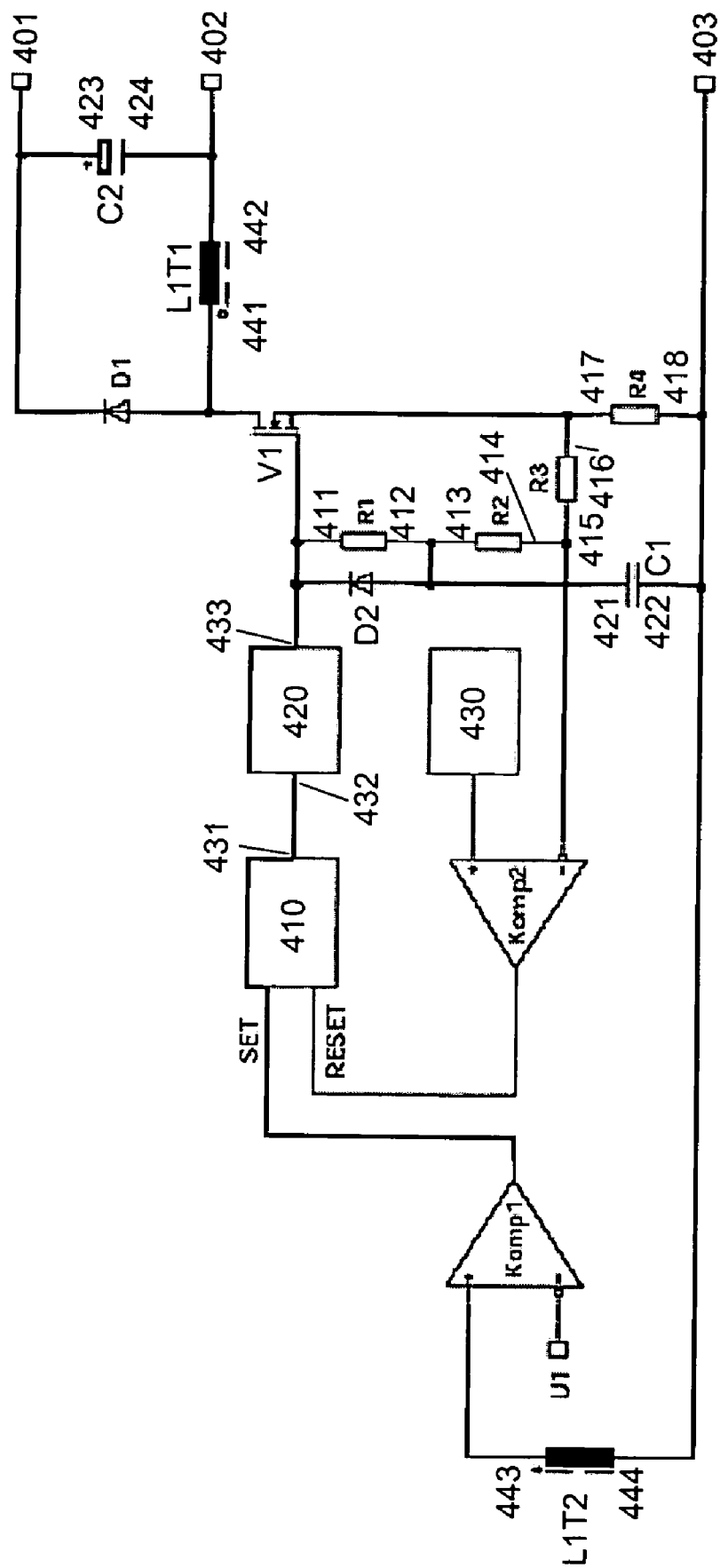
FIG. 4 is an alternative circuit diagram of a buck converter with a triggering of an electronic switch.

FIG. 4 shows a circuit of a buck converter with an associated triggering of the electronic switch.

FIG. 4 includes two comparators (Komp1 and Komp2), a pulse width modulation unit 410 (with inputs SET, RESET and an output 431), a driver 420 (with an input 432 and an output 433), a control voltage unit 430, a primary winding L1T1 of an inductance L1 (with connections 441 and 442), a secondary winding L1T2 of the inductance L1 (with connections 443 and 444), a capacitor Cl (with connections 421 and 422), an (electrolytic) capacitor C2 (with connections 423 (positive pole) and 424), an n-channel MOSFET V1, two diodes Dl and D2, and resistors R1 (with connections 411 and 412), R2 (with connections 413 and 414), R3 (with connections 415 and 416), and R4 (with connections 417 and 418). An input (with connections 403 and 401) and an output (with connections 402 and 401) are also provided. The connection 401 is the shared positive pole of the input and output. A reference voltage U1 is also provided.

The connection 443 of the secondary winding L1T2 is connected to the positive input of the comparator Komp1 while the reference voltage U1 contacts the negative input of the comparator Komp1. The output of the comparator Komp1 is connected to the SET input of the pulse width modulation 410. The connection 444 of the secondary winding L1T2 is connected to the connection 422 of the capacitor C1, to the connection 418 of the resistor R4, and to the connection 403 of the input. The output 431 of the pulse width modulation 410 is connected to the input 432 of the driver 420. The output 433 of the driver 420 is connected to the cathode of the diode D2, to the connection 411 of the resistor R1, and to the gate connection of the MOSFET V1. The anode of the diode D2 is connected to the connection 421 of the capacitor C1, to the connection 412 of the resistor R1, and to the connection 413 of the resistor R2. The connection 414 of the resistor R2 is connected to the connection 415 of the resistor R3 and to the negative input of the comparator Komp2. The connection 416 of the resistor R3 is connected to the connection 417 of the resistor R4 and to the source connection of the MOSFET V1. The control voltage unit 430 supplies a control voltage to the positive input of the comparator Komp2. The output of the comparator Komp2 is connected to the RESET input of the pulse width modulation 410.

The drain connection of the MOSFET V1 is connected to the anode of the diode D1 and to the connection 441 of the primary winding L1T1 of the inductance L1. The connection 442 of the primary winding L1T1 is connected to the connection 424 of the capacitor C2 and to the connection 402 of the output. The cathode of the diode D1 is connected to the connection 423 of the capacitor C2 and to the connection 401 of the input and output.

Operation of the Circuit According to FIG. 4:

The resistor R4 is a measuring resistor for measuring the current flowing through the inductance L1, which is measured in the source circuit of the MOSFET V1. The current signal is combined with a saw tooth voltage ramp. The pulse width modulation 410 according to FIG. 4 functions, for example, like a flip-flop. The (low active) SET input of the pulse width modulation 410 switches on the MOSFET V1 and the RESET input of the pulse width modulation 410 switches off the MOSFET V1. The comparator Komp1 performs a demagnetization detection of the inductance L1T1 by means of the auxiliary winding L1T2: through a comparison with the reference voltage U1, the comparator Komp1 then switches on the MOSFET V1 (via the pulse width modulation 410 and the driver 420) once the inductance has been completely demagnetized. The delay while waiting for the complete demagnetization of the inductance L1 (L1T1, determined by means of the auxiliary winding L1T2) reduces the switching losses.

The saw tooth signal is determined in particular by means of the capacitor C1, the resistor R1, and the diode D2; the resistors R2, R3, and R4 make it possible to overlay the current signal and the saw tooth signal. When the control preset that the control voltage unit 430 predetermines by means of its control voltage is exceeded, the comparator Komp2 switches off.

The connections of the output are reversed in comparison to the depiction in FIG. 3 in order to simplify the potential ratios for measurement of the current flowing through the inductance and the control circuit.

For example, the control voltage unit 430 supplies a reference variable that is determined based on a predetermined reference value and the output voltage of the buck converter. For example, if the output voltage of the buck converter deviates from the predetermined value, then the control voltage unit 430 adapts the reference variable so that the output voltage once again corresponds to the predetermined value.

Figure 5:
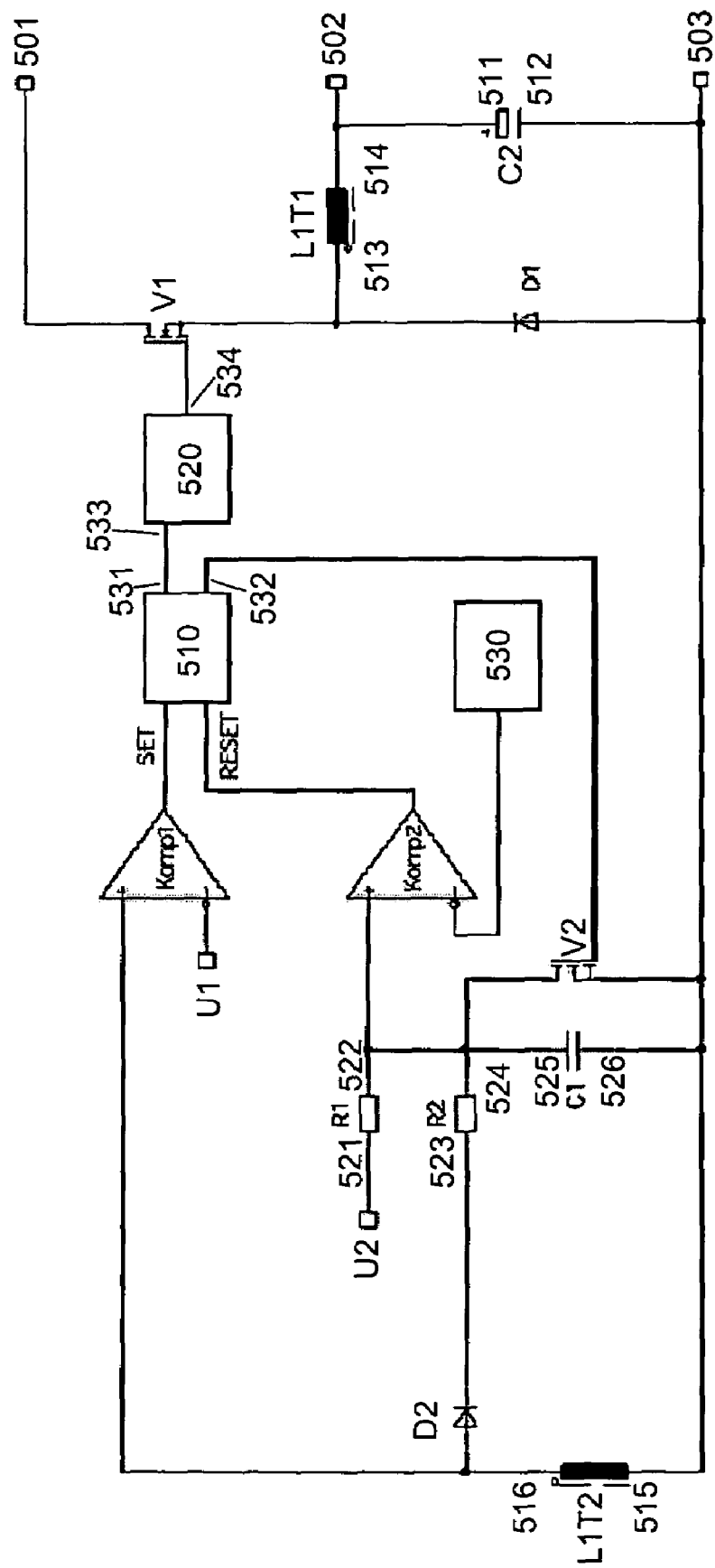
FIG. 5 is another circuit diagram of a buck converter with a triggering of an electronic switch.

FIG. 5 shows an alternative circuit diagram of a buck converter with a triggering of an electronic switch.

FIG. 5 includes to comparators Komp1 and Komp2, a pulse width modulation 510 with inputs SET and RESET and outputs 531 and 532, a driver 520 (with an input 533 and an output 534), an n-channel MOSFET V1 and an n-channel MOSFET V2, a control voltage unit 530, an inductance L1 with a main winding L1T1 (with connections 513 and 514) and auxiliary winding L1T2 (with connections 515 and 516), diodes D1 and D2, a capacitor C1 (with connections 525 and 526), an electrolytic capacitor C2 (with connections 511 (positive pole) and 512), a reference voltage U1, a reference voltage U2, and resistors R1 (with connections 521 and 522) and R2 (with connections 523 and 524). An input (with connections 501 and 503) and an output (with connections 502 and 503) are also provided. The connection 503 is the common negative pole shared by the input and output.

The output of the comparator Komp1 contacts the SET input of the pulse width modulation 510. The output 531 of the pulse width modulation 510 is connected to the input 533 of the driver 520 while the output 534 of the driver 520 is connected to the gate connection of the MOSFET V1. The output 532 of the pulse width modulation 510 is connected to the gate connection of the MOSFET V2. The drain connection of the MOSFET V1 is connected to the connection 501 of the input. The source connection of the MOSFET V1 is connected to the cathode of the diode D1 and to the connection 513 of the primary winding L1T1 of the inductance L1. The connection 514 of the primary winding L1T1 is connected to the connection 502 of the output and to the connection 511 of the capacitor C2. The connection 512 of the capacitor C2 is connected to the connection 503 of the input and output, to the anode of the diode D1, to the source input of the MOSFET V2, to the connection 526 of the capacitor C1, and to the connection 515 of the auxiliary winding L1T2 of the inductance L1. The connection 516 of the auxiliary winding L1T2 is connected to the anode of the diode D2 and to the positive input of the comparator Komp1. The negative input of the comparator Komp1 is connected to the reference voltage U1. The cathode of the diode D2 is connected to the connection 523 of the resistor R2 while the connection 524 of the resistor R2 is connected to the connection 525 capacitor C1, to the drain connection of the MOSFET V2, to the connection 522 of the resistor R1, and to the positive input of the comparator Komp2. The connection 521 of the resistor R1 is connected to the reference voltage U2. The output of the control voltage unit 530 is connected to the negative input of the comparator Komp2. The output of the comparator Komp2 is connected to the RESET input of the pulse width modulation 510.

Operation of the Circuit According to FIG. 5:

The reference voltages U1 and U2 are preferably generated by a voltage divider (not shown). The driver 520 preferably functions to achieve a potential-free triggering of the MOSFET V1.

The comparator Komp1 is used for demagnetization detection as described in conjunction with FIG. 4. The resistor R2 and capacitor C1 are used in combination with the auxiliary winding L1T2 for balancing the current by means of the primary winding L1T1 of the inductance L1. Preferably, the low-pass comprised of the resistor R2 and capacitor C1 has a significantly higher frequency $1/\tau$, where $$\tau = R2 * C1$$

than the operating frequency of the buck converter (typically from approx. 20 KHz to 200 KHz). As a result, the voltage at the capacitor C1 increases in accordance with the current. An overlay with a current-dependent time element R1C1 occurs, i.e. the charging of the capacitor C1 is dependent on both the input voltage-proportional signal (via the auxiliary winding L1T2) and the reference voltage U2.

If the MOSFET V1 is switched off, then the MOSFET V2 is triggered and discharges the capacitor C1.

As opposed to the depiction in FIG. 4, FIG. 5 shows a common negative potential shared by the input and output. By contrast with FIG. 4, instead of measuring the current flowing through the inductance L1, the current signal is determined through an integration of the voltage in the inductance L1. The overlaying with the saw tooth signal occurs through integration of a reference voltage U2.

Figure 6:
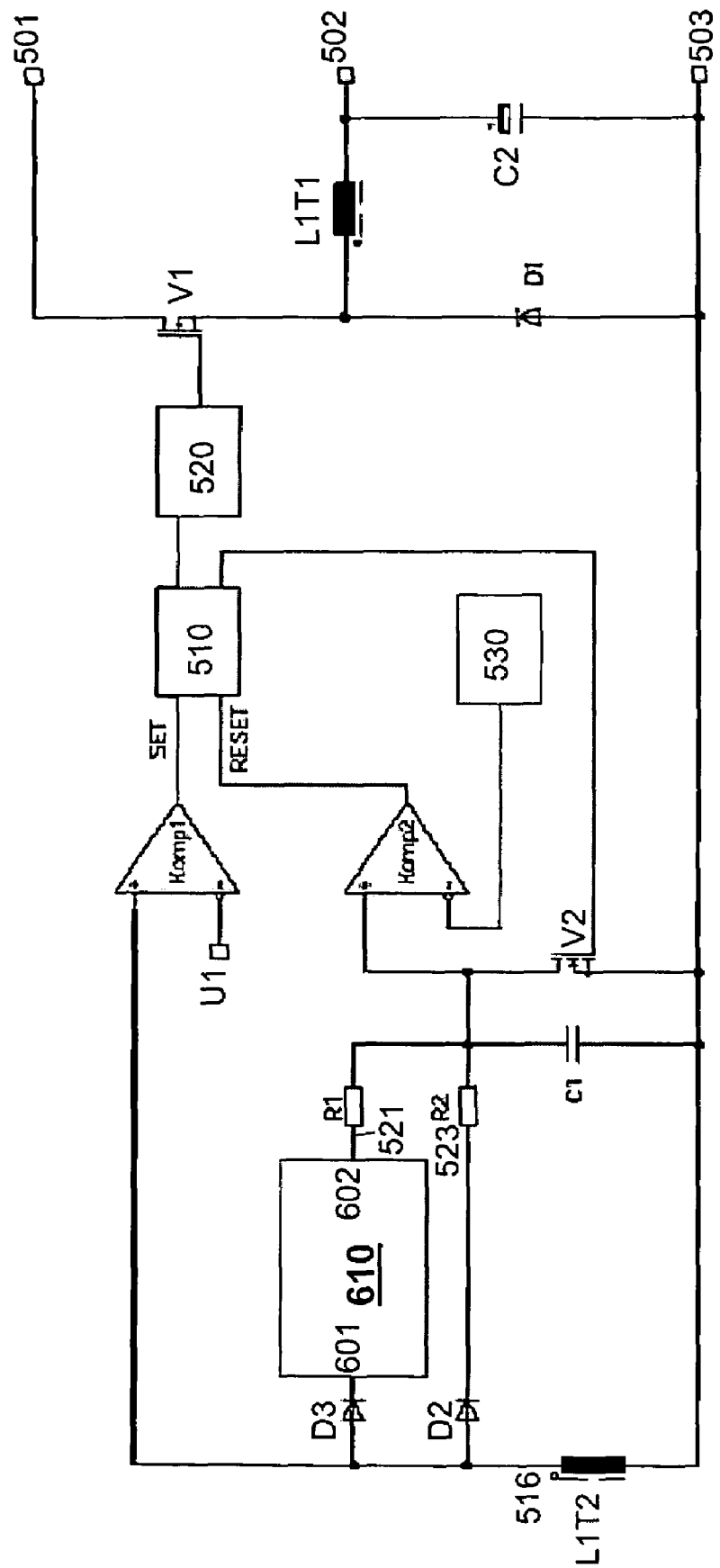
FIG. 6 is a circuit diagram of a buck converter with a triggering of an electronic switch and a peak value rectifier.

FIG. 6 shows another circuit diagram of a buck converter with a triggering of an electronic circuit and corresponds in many parts to the depiction in FIG. 5. In lieu of the reference voltage U2, FIG. 6 shows a peak value rectifying unit 610 with an input 601, an output 602, and a diode D3.

The anode of the diode D3 is connected to the anode of the diode D2, to the connection 516 of the auxiliary winding L1T2, and to the positive input of the comparator Komp1. The cathode of the diode D3 is connected to the input 601 of the peak value rectifier 610, while the output 602 of the peak value rectifier 610 is connected to the connection 521 of the resistor R1. The reference voltage U2 (from FIG. 5) is eliminated.

Operation of the Circuit According to FIG. 6:

In addition to the explanations made in conjunction with FIG. 5, the peak value rectifier 610 is provided in FIG. 6. Preferably, the voltage of the inductance L1 via the auxiliary winding L1T2 is rectified with a retention time constant that is greater than a line period (when the circuit is used in a power supply, in particular a switched mode power supply). This limits the peak current of the current flowing through the inductance, independent of the line voltage. In particular, the retention time constant can be (significantly) greater than five times the line period.

Figure 7:
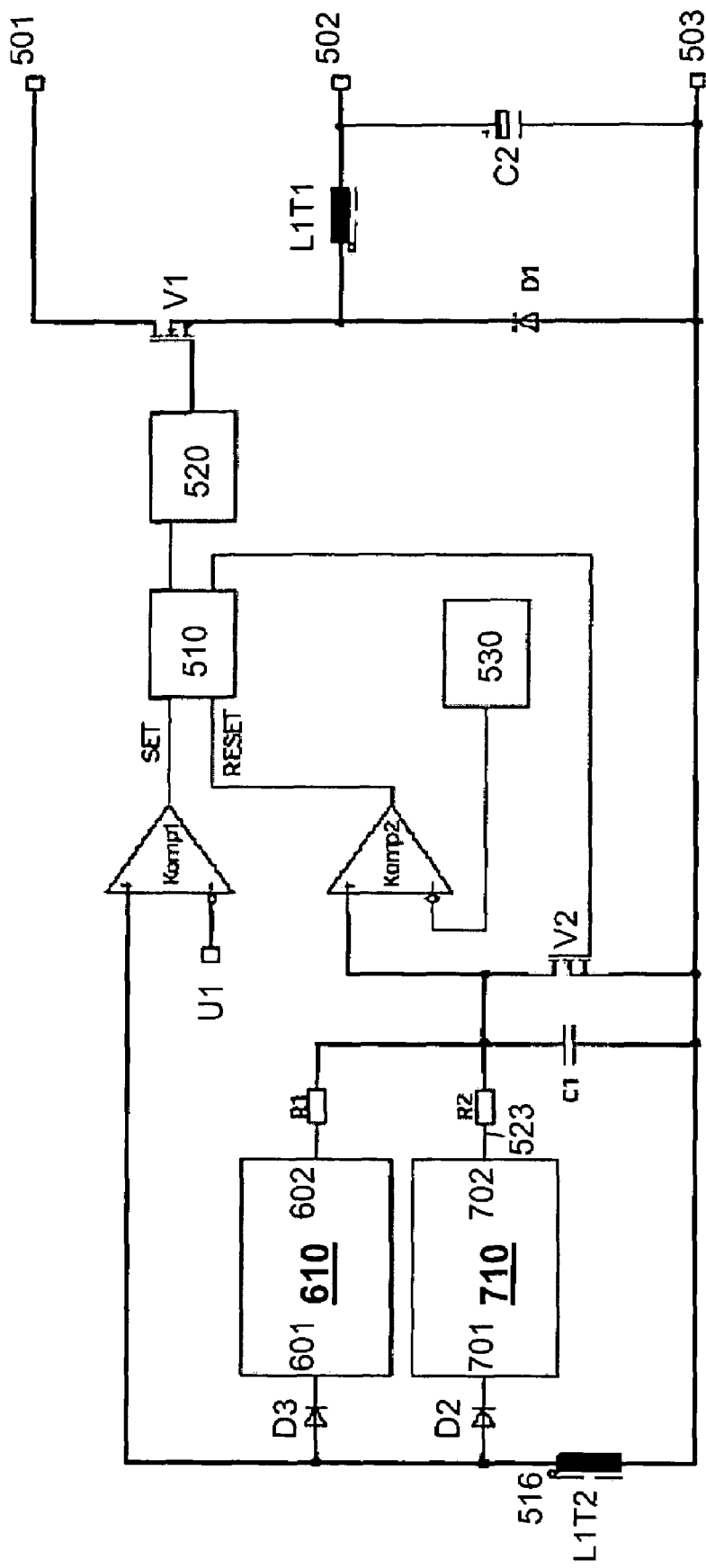
FIG. 7 is a circuit diagram of a buck converter with a triggering of an electronic switch according to FIG. 6 and a peak value rectifier.

FIG. 7 shows another circuit diagram of a buck converter with a triggering of an electronic circuit and corresponds in many parts to the depiction in FIG. 6. In FIG. 7, an additional peak value rectifier 710 is provided, with an input 701 and an output 702.

Instead of the cathode of the diode D2 being connected to the connection 523 of the resistor R2 as in FIG. 6, in FIG. 7, the cathode of the diode D2 is connected to the input 701 of the peak value rectifier 710. The output 702 of the peak value rectifier 710 is connected to the connection 523 of the resistor R2.

Operation of the Circuit According to FIG. 7:

In lieu of the direct integration of the voltage (for current balancing) in the inductance L1 (determined via the auxiliary winding L1T2) as in FIG. 5 or FIG. 6, in FIG. 7, an additional peak value rectification is performed, in particular with a significantly lower retention time constant than the line period (e.g. 1/5 the line period). The advantageously suppresses undesirable interactions with preceding components and/or with the line impedance.

Figure 8:
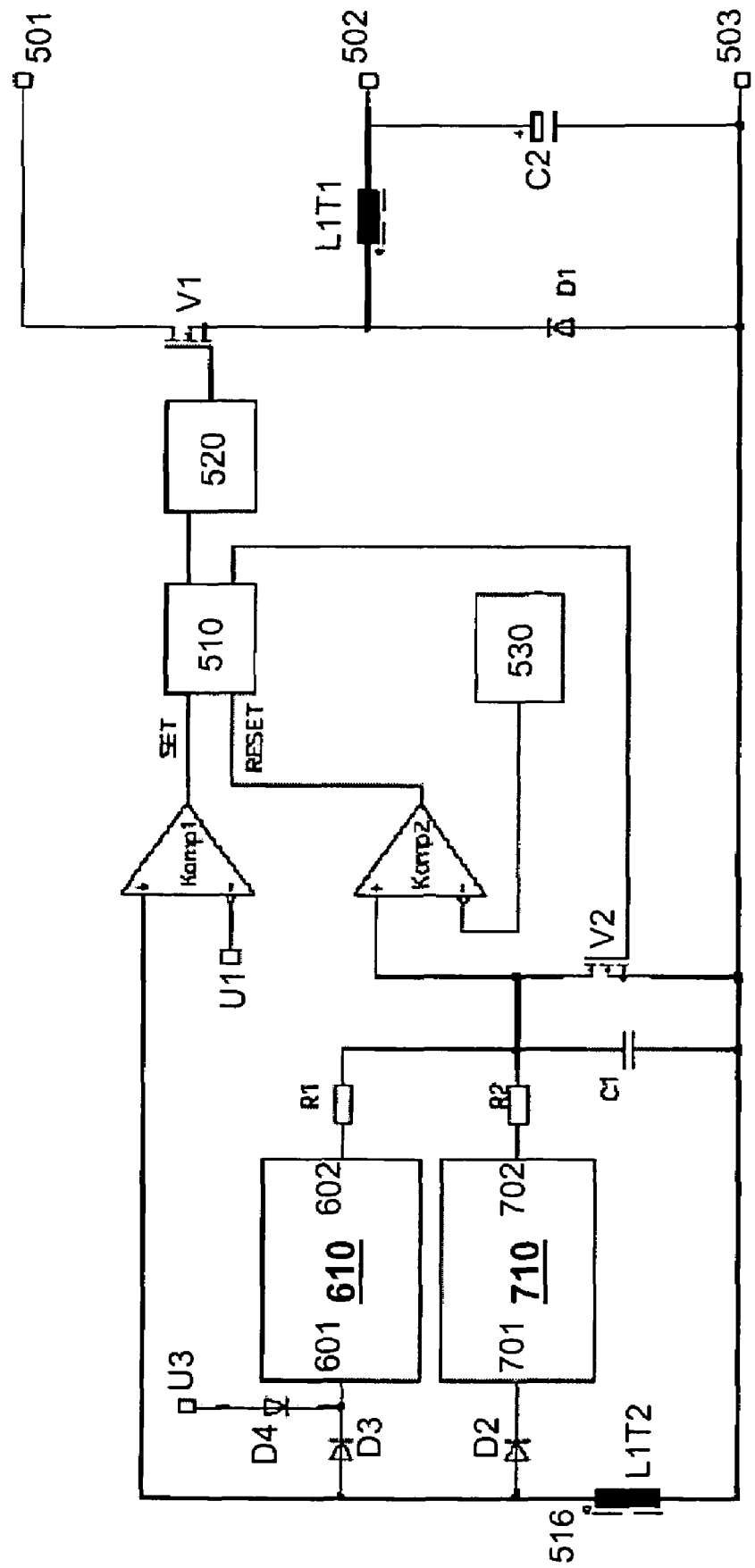
FIG. 8 is a circuit diagram of a buck converter with a triggering of an electronic switch according to FIG. 7 and a limiting of the switching-on duration.

FIG. 8 shows another circuit diagram of a buck converter with a triggering of an electronic circuit and corresponds in many parts to the depiction in FIG. 7. In FIG. 8, a reference voltage U3 and a diode D4 are also provided.

The reference voltage U3 contacts the anode of the diode D4, while the cathode of the diode D4 is connected to the cathode of the diode D3 and to the input 601 of the peak value rectifier 610.

Figure 9:
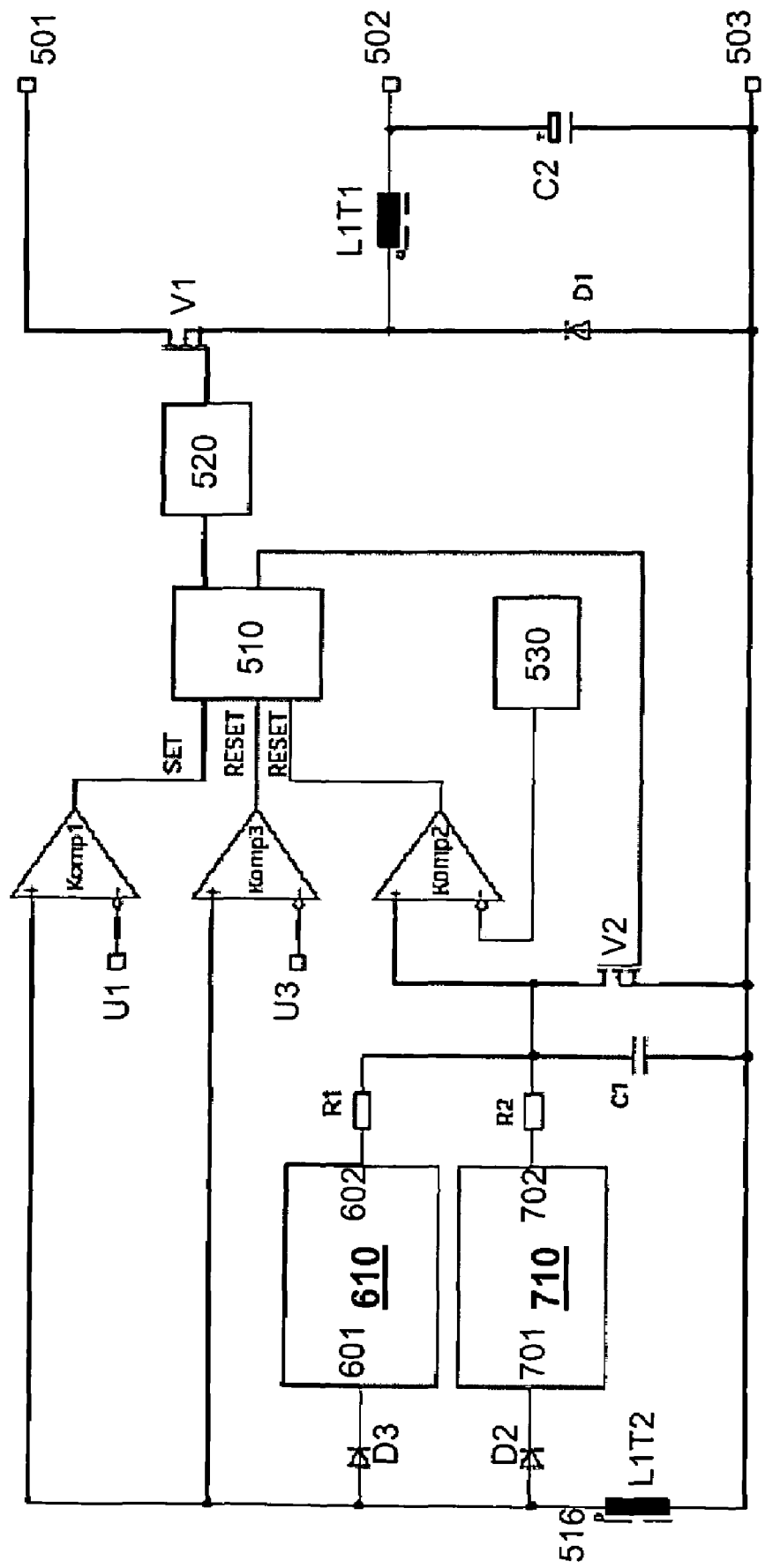
FIG. 9 is a circuit diagram of a buck converter with a triggering of an electronic switch according to FIG. 7 with an alternative limiting of the switching-on duration.

FIG. 9 shows another circuit diagram of a buck converter with a triggering of an electronic circuit and corresponds in many parts to the depiction in FIG. 7. In FIG. 9, a reference voltage U3 and a comparator Komp3 are also provided.

The positive input of the comparator Komp3 is connected to the positive input of the comparator Komp1, to the anode of the diode D3, to the anode of the diode D2, and to the connection 516 of the auxiliary winding L1T2. The negative connection of the comparator Komp3 is connected to the reference voltage U3. The output of the comparator is connected to an (additional) RESET input of the pulse width modulation 510.

Operation of the Circuit According to FIGS. 8 and 9:

With very small differences between the input voltage and the output voltage, the voltage via the inductance L1 can fall to zero and the current through the inductance can no longer increase. This effect can occur, for example, when a radio interference filter precedes the circuit and can be due to the impedance of this radio interference filter and/or the line impedance.

In order to prevent excessively long switch-on times and thus the excitation of undesirable modes (harmonics), particularly due to a current modulation with subharmonics of the switching frequency, the switch-on duration is limited in that a minimum value of the voltage in the peak value memory of the peak value rectifier 610 is predetermined in conjunction with the reference voltage U3 (see FIG. 8).

Alternatively, the voltage in the inductance L1 can be monitored and when it falls below a predetermined threshold (minimum value), a disconnection can be executed (see FIG. 9).

Figure 10:
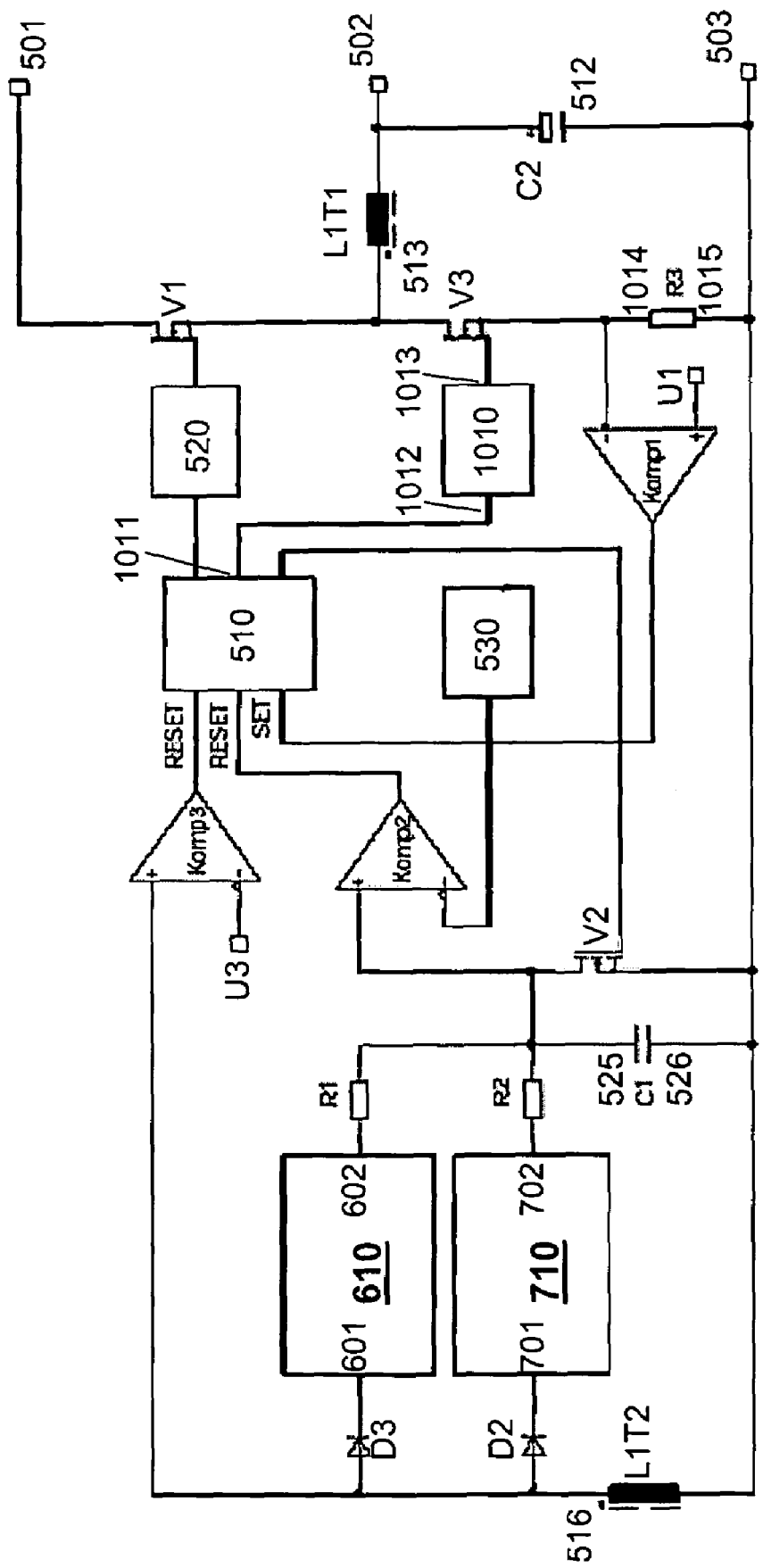
FIG. 10 is a circuit diagram of a buck converter with a triggering of an electronic switch according to FIG. 9, in which the diode has been replaced with an additional electronic switch.

FIG. 10 shows another circuit diagram of a buck converter with a triggering of an electronic circuit and corresponds in many parts to the depiction in FIG. 9. In FIG. 10, a driver 1010 (with an input 1012 and an output 1013), a resistor R3 (with connections 1014 and 1015), and an n-channel MOSFET V3 are provided. In addition, the pulse width modulation 510 has an additional output 1011. The diode D1 is eliminated and is replaced by the MOSFET V3 and the resistor R3.

The negative input of the comparator Komp1 is connected to the source connection of the MOSFET V3 and to the connection 1014 of the resistor R3. The positive connection of the comparator Komp1 is connected to the reference voltage U1. The output of the comparator Komp1 (unchanged from FIG. 9) is connected to the SET input of the pulse width modulation 510. The output 1011 of the pulse width modulation 510 is connected to the input 1012 of the driver 1010, while the output 1013 of the driver 1010 is connected to the gate connection of the MOSFET V3. The drain connection of the MOSFET V3 is connected to the source connection of the MOSFET V1 and to the connection 513 of the primary winding L1T1 of the inductance L1. The remaining connection 1015 of the resistor R3 is connected to the connection 503 (negative pole) of the input and output, to the connection 512 of the capacitor C2, to the source connection of the MOSFET V2, to the connection 526 of the capacitor C1, and to the connection 515 of the auxiliary winding L1T2.

Operation of the Circuit According to FIG. 10:

In the circuit according to FIG. 10, the diode D1 is replaced by the MOSFET V3 (and the resistor R3). This achieves an additional reduction in the switching losses, particularly if the input voltage is greater than the output voltage (overload). The signal for switching-off the MOSFET V3 and the (delayed) switching-on of the MOSFET V1 (SET signal at the pulse width modulation 510) is derived from the magnitude of the reverse current, measured by means of the resistor R3 and combined via the comparator Komp1. It is optionally possible to carry out control interventions in the MOSFETs V1 and V2.

It should also be noted that the comparators shown above and mentioned in conjunction with the figures can also be replaced by transistors, e.g. bipolar or field effect transistors.

What is claimed is:

1. A buck converter comprising:
   an input with a first connection (101) and second connection (102),
   an output with a first connection (103) and second connection (104),
   a switch (110),
   a diode (D1) having a cathode and an anode
   an inductance (L1),
   a capacitor (C1),
   wherein the first connection (101) of the input is connected to the first connection (103) of the output via a series circuit comprised of the switch (110) and the inductance (L1), the cathode of the diode (D1) is connected to the connection between the switch (110) and the inductance (L1), the anode of the diode (D1) is connected to the second connection (102) of the input and to the second connection (104) of the output, and the capacitor (C1) is connected in parallel with the connections (103, 104) of the output, such that the switch (110) is triggered from a first state to a second state by combining a first signal with a second signal,
   wherein the switch is triggered by combining the first signal with the second signal and a third signal,
   wherein the second signal is an essentially triangular shaped signal generated by a saw tooth generator, and
   means for adding the current signal and the essentially triangular shaped signal by integration of a voltage in the inductance (L1) and an additional voltage.

2. The buck converter as recited in claim 1, wherein the first connection (101) of the input is of a positive polarity and the second connection (102) of the input is of a negative polarity.

3. The buck converter as recited in claim 1, wherein the third signal is a control variable from the output of the buck converter and is used to adjust the output signal of the buck converter and is substantially constant.

4. The buck converter as recited in claim 1, further including means for regulating, wherein the third signal is adjustable or controllable by at least one predetermined parameter selected from among an output voltage of the buck converter, an output current of the buck converter, and a power of the buck converter.

5. The buck converter as recited in claim 1, wherein the switch (110) comprises at least one electronic switch.

6. The buck converter as recited in claim 1, wherein the diode (D1) is embodied in the form of an electronic switch.

7. The buck converter as recited in claim 5, wherein said at least one electronic switch is selected from the group comprising a transistor or at least one MOSFET, at least one thyristor, and at least one IGBT.

8. The buck converter as recited in claim 1, wherein the switch is triggered by a signal representing the sum of the first signal and the second signal.

9. The buck converter as recited in claim 8, wherein the sum of the first signal and the second signal is compared to the third signal.

10. The buck converter as recited in claim 1, wherein the first signal is a current signal that corresponds to the current through the electronic switch (110).

11. The buck converter as recited in claim 1, further including means for determining the additional voltage by peak value rectification of the voltage in the inductance using a retention time constant that is, in particular, greater than the line period.

12. The buck converter as recited in claim 11 further including means for an additional peak value rectification using a retention time constant that is less than the line period.

13. The buck converter as recited in claim 1, further including means for limiting on time duration of the switch (110) if the voltage in the inductance falls below a predeterminable minimum voltage.

14. The buck converter as recited in claim 13, wherein an online duration of the switch (110) is limited when the voltage in the inductance falls below the predeterminable minimum voltage.

15. A buck converter, comprising:
   an input with a first connection (101) and second connection (102);
   an output with a first connection (103) and second connection (104);
   a switch (110);
   a diode (D1) having a cathode and an anode;
   an inductance (L1);
   a capacitor (C1);

wherein the first connection (101) of the input is connected to the first connection (103) of the output via a series circuit comprised of the switch (110) and the inductance (L1);

the anode of the diode (D1) is connected to the connection between the switch (110) and the inductance (L1), the cathode of the diode (D1) is connected to the second connection (102) of the input and to the second connection (104) of the output, and the capacitor (C1) is connected in parallel with the first and second connections (103, 104) of the output, and such that the switch (110) is triggered from a first state to a second state by combining a first signal with a second signal, wherein the switch is triggered by combining the first signal with the second signal and a third signal, wherein the second signal is an essentially triangular shaped signal generated by a saw tooth generator, and means for adding the current signal and the essentially triangular shaped signal by integration of a voltage in the inductance (L1) and an additional voltage.

16. The buck converter as recited in claim 15, wherein the first connection (101) of the input is of a negative polarity and the second connection 102 of the input is of a positive polarity.

17. The buck converter as recited in claim 15, wherein the third signal is a control variable from the output of the buck converter and is used to adjust the output signal of the buck converter and is substantially constant.

18. The buck converter as recited in claim 15, further including means for regulating, wherein the third signal is adjustable or controllable by at least one predetermined parameter selected from among an output voltage of the buck converter, an output current of the buck converter, and a power of the buck converter.

19. The buck converter as recited in claim 15, wherein the switch (110) comprises at least one electronic switch.

20. The buck converter as recited in claim 15, wherein the diode (D1) is embodied in the form of an electronic switch.

21. The buck converter as recited in claim 20, wherein said at least one electronic switch is selected from the group comprising a transistor or at least one MOSFET, at least one thyristor, and at least one IGBT.

22. The buck converter as recited in claim 15, wherein the switch is triggered by a signal representing the sum of the first signal and the second signal.

23. The buck converter as recited in claim 22, wherein the sum of the first signal and the second signal is compared to the third signal.

24. The buck converter as recited in claim 15, wherein the first signal is a current signal that corresponds to the current through the electronic switch (110).

25. The buck converter as recited in claim 15, further including means for determining the additional voltage by peak value rectification of the voltage in the inductance using a retention time constant that is, in particular, greater than the line period.

26. The buck converter as recited in claim 25, further including means for an additional peak value rectification using a retention time constant that is less than the line period.

27. The buck converter as recited in claim 15, further including means for limiting on time duration of the switch (110) if the voltage in the inductance falls below a predeterminable minimum voltage.

28. The buck converter as recited in claim 27, wherein an online duration of the switch (110) is limited when the voltage in the inductance falls below the predeterminable minimum voltage.

* * * * *